United States Patent [19]

Pullukat et al.

[11] Patent Number: 4,478,988

[45] Date of Patent: Oct. 23, 1984

[54] POLYMERIZATION METHOD

[75] Inventors: Thomas J. Pullukat, Hoffman Estates; Raymond E. Hoff, Palatine, both of Ill.

[73] Assignee: Chemplex Company, Rolling Meadows, Ill.

[21] Appl. No.: 381,730

[22] Filed: May 24, 1982

Related U.S. Application Data

[62] Division of Ser. No. 287,950, Jul. 29, 1981, Pat. No. 3,374,753.

[51] Int. Cl.$^3$ .......................... C08F 4/02; C08F 10/02
[52] U.S. Cl. .................................... 526/128; 526/129; 526/156; 526/348.5; 526/348.6; 526/352
[58] Field of Search ................................ 526/128, 129

[56] References Cited

U.S. PATENT DOCUMENTS

| | | | |
|---|---|---|---|
| 2,981,725 | 4/1961 | Luft et al. | 526/125 |
| 3,647,772 | 3/1972 | Kashiwa | 526/124 |
| 4,105,585 | 8/1978 | Matheson | 526/142 |
| 4,110,523 | 8/1978 | Schweier et al. | 526/125 |
| 4,130,699 | 12/1978 | Hoff et al. | 526/125 |
| 4,263,168 | 4/1981 | Rochefort et al. | 526/124 |
| 4,301,029 | 11/1981 | Carent et al. | 526/137 |
| 4,335,016 | 6/1982 | Dombro | 526/128 |

FOREIGN PATENT DOCUMENTS

| | | |
|---|---|---|
| 2721058 | 11/1978 | Fed. Rep. of Germany. |
| 2721094 | 11/1978 | Fed. Rep. of Germany. |
| 69/3534 | 7/1969 | South Africa. |

*Primary Examiner*—Edward J. Smith
*Attorney, Agent, or Firm*—Wood, Dalton, Phillips, Mason & Rowe

[57] ABSTRACT

A catalyst and method in which the catalyst is used in association with an aluminum cocatalyst in the polymerization and copolymerization of 1-olefins. The catalyst is prepared by reacting certain organic silicon compounds with silica, alumina or the like having surface hydroxyl groups, or a mixture thereof, in which the silicon compound reacts with these surface hydroxyl groups, followed by reacting the product of this with an organomagnesium compound and further reacting this product with an alcohol or reacting the product with an alcohol and then with an organomagnesium compound and then with a halide or alkoxide of titanium, vanadium, zirconium or mixtures of these.

21 Claims, No Drawings

POLYMERIZATION METHOD

This is a division of application Ser. No. 287,950 filed July 29, 1981, now U.S. Pat. No. 3,374,753.

BACKGROUND OF THE INVENTION

In this invention, the polymerization catalysts useful in polymerizing and copolymerizing 1-olefins are prepared by the reaction of silica or alumina with a functional silane compound, organomagnesium compound, an alcohol, and a titanium, vanadium, zirconium or mixture of these compounds. These catalysts are then activated, associating them with an organoaluminum cocatalyst. These catalyst products are primarily useful for the polymerization of 1-olefins such as ethylene and the copolymerization of these 1-olefins.

One of the features of the invention is to provide an improved method of polymerizing with these catalysts in the particle form slurry, gas phase or solution form polymerization processes.

Another feature of the invention is that the polymerization reactions promoted by the improved catalysts are more readily modified by hydrogen so that desirable high melt index polymers are easily made.

A further feature is that the higher melt index polymers so produced are narrow in molecular weight distribution and are therefore highly suitable for injection molding or cast film applications.

Yet another feature of the invention is to provide a catalyst yielding high melt index, high density polyethylene in the particle form process without reactor fouling.

Still another feature of this invention is the production of ethylene-1-alkene copolymers, commonly known as linear low density polyethylene (LLDPE), by the catalyst of this invention. These copolymers can have densities from 0.915 to 0.960 g/cm$^3$ and properties suitable for film and injection molding applications, for example.

K. Ziegler first discovered two component catalysts based on compounds of the Group IVB–VIB metals of the periodic table and an organometallic compound belonging to Groups I–IIIA of the periodic table for the polymerization of olefins. Since his discovery, numerous catalysts have been disclosed as improvements over the original Ziegler catalysts. Most of these catalyst systems are of relatively low activity and stability. They require a costly catalyst removal step.

One of the modifications attempted in an effort to increase the activity of the Ziegler type catalyst was to deposit the catalyst components on an inert support. In U.S. Pat. No. 2,981,725, such a process is disclosed. The supports used were magnesium chloride, silicon carbide, silica gel, calcium chloride, etc.

The activity of the catalysts disclosed in these patents was still low.

South Africa Appln. Nos. 69/3534, 10/5/69 by Van Den Berg and Tomiers of Stamicarbon describes catalysts made from organomagnesium compounds, alkyl aluminum chloride compounds, and titanium compounds which are increased in reactivity by the addition of alcohols. A support, or granular ingredient, is not used, there is no separation of the solvent, and the use of a cocatalyst is not disclosed.

German Offen. Nos. 2,721,058, 11/23/78, by Gunter Schweier et al. of BASF reveals a catalyst with a porous inorganic oxide like silica or silica-alumina as a support. A solution of a reaction mixture of an alcohol, a titanium trihalide, and a magnesium compound is added to the oxide, and then the solvent (i.e. the alcohol) is evaporated giving an intermediate solid product. This solid product is suspended in a solution of an organometallic compound, which may be an alkyl aluminum or silicon halide compound. The suspended solid component may be used as is along with an organometallic compound as a cocatalyst. The suspended solid compound can also be filtered, and washed prior to use, and for gas phase polymerization it can be coated with wax. The magnesium compounds are not alkyl magnesium compounds but alkoxides and halides and other types of compounds.

Another Schweier patent, German Offen. No. 2,721,094 is similar to this one. It reveals that the silica or silica-alumina may be treated with an alkyl aluminum halide compound beforehand.

U.S. Pat. No. 4,110,523, Aug. 29, 1978, also by Schweier et al., covers a similar catalyst. In this case, the treatment with the alkyl aluminum or silicon halide solution is eliminated.

U.S. Pat. No. 4,130,699, Dec. 19, 1978 by G. R. Hoff and Peter Fotis of Standard Oil Company discloses supported catalysts for vapor phase polymerization which are made less active prior to feeding to the reaction vessel by treatment with alcohols, acetates, ketones, aldehydes, or esters.

U.S. Pat. No. 4,105,585, Aug. 8, 1978, by Ian Matheson of BP Chemicals describes catalysts prepared from the reaction of magnesium powder, a titanium halide and alcohol.

U.S. Pat. No. 3,647,772 by N. Kashiwa (Mitsui Petrochemical, May 7, 1972 involves treating anhydrous magnesium carbonate with polar organic compounds including alcohols. When this is done, more titanium from titanium tetrachloride can be fixed upon the magnesium carbonate. Catalyst reactivity, melt index and bulk density of the product are increased by the treatment with the polar organic compound.

None of the above patents disclose the method and products of this invention.

SUMMARY OF THE INVENTION

The catalysts of this invention are formed from four reactive materials. One of the reactive materials is the product formed by the interaction of an oxide like silica or alumina with an organic silicon compound. This silane-treated silica or alumina is combined with an organomagnesium compound, an alcohol, and a titanium or vanadium compound. From the resulting reaction mixture, a solid, free-flowing catalyst is separated. The catalyst so formed is activated by an organoaluminum compound.

This invention provides novel catalysts, methods of making them and methods of polymerizing and copolymerizing 1-olefins. These catalysts are especially useful for the polymerization of ethylene to high density polyethylene, and for the copolymerization of ethylene with 1-olefins for the formation of medium and low density copolymers. These improved catalysts are highly active and are well suited for the economical and energy efficient particle form and gas phase processes.

Specifically, the object of this invention is to improve the well known Ziegler type catalyst by the method of this invention. These improved catalysts can be easily adapted to the particle form or gas phase process plants. Polymers made using the invention catalysts can have high MI and narrow molecular weight distribution. Thus, polymers well suited for injection molding and rotational applications can be manufactured. The catalysts of this invention are stable, particulate, and easy flowing.

The alcohol modification allows the production of higher melt index polymers in response to the addition of hydrogen to the polymerization reaction. The silane treatment, in comparison with catalysts prepared without the silane treatment of the silica or alumina, leads to polymers of more narrow molecular weight distributions. The catalysts of this invention surprisingly retain both of these good features and are thus superior for the production of high melt index injection molding resins by ethylene polymerization.

A totally unexpected advantage of the invention catalysts is that they can produce ethylene-1-olefin copolymers (so-called LLDPE, linear low density polyethylene), with melt elasticity properties suitable for the manufacture of high strength blown film.

The catalysts of this invention yield polymers with high melt index values at relatively low hydrogen concentration in the polymerization reaction. Thus, less hydrogen is required to obtain a given desired high melt index. This affords a savings on hydrogen and gives a higher reactivity because higher concentrations of hydrogen decrease the polymerization rate. The catalysts of this invention give a relatively narrow molecular weight distribution at a given melt index. A narrow molecular weight distribution is desirable in polymers used for injection molding and in cast film applications because better strength is obtained.

In the copolymerization of 1-olefins and ethylene to form low density copolymers of lower melt index, the catalysts of this invention can produce products with superior melt elasticity which is associated with high strength blown film.

The catalysts of this invention are made from a combination of silica or alumina, certain organic silicon compounds, an organomagnesium compound, an alcohol, and a titanium compound. The catalysts are activated by an organoaluminum compound.

The silica or alumina materials may contain minor amounts of zirconia, magnesia, or titania. For catalyst manufacture, it is preferred to have relatively finely divided silica or alumina, which may be porous or nonporous.

The organic silicon compound must have at least one functional group which can react with the surface hydroxyl groups of the silica or alumina, and by means of this reaction the organic silicon residue must be bonded to the surface of the silica or alumina or mixtures of these. Prior to the reaction between the organic silicon compound and the silica or alumina, the silica or alumina may be dried to completely remove the water at a temperature less than about 800° C. The drying may be only partial so as to leave a small amount of water to catalyze the reaction of the organic silicon compound with the surface groups. Usually, it is preferred to at least partially remove the surface water from the silica or alumina.

The amount of organic silicon compound may be in excess of the reactive surface groups. In this case, the conversion of the surface groups can be made as complete as possible, and the unreacted excess can be removed by distillation at less than 200° C., at pressures less than one atmosphere if necessary, or by heating combined with purging with an inert gas. The reaction product of the silica or alumina with the organic silicon compound should not be heated above 300° C., since decomposition of the bonded silane groups may occur. The amount of organic silicon compound may be less than the stoichiometric equivalent of the surface reactive groups. In this case, no removal of excess is necessary.

The alcohols that are suitable for this invention contain only one alcoholic hydroxyl group per molecule, and only carbon and hydrogen atoms in addition to the one oxygen atom. Phenols of alcohols with the hydroxyl directly bonded to an aromatic ring are not suitable.

The alcohol can be added to the silane-treated silica or alumina immediately prior to the addition of the organomagnesium compound. The alcohol can also be added after the organomagnesium compound. It must, however, be combined into the catalyst mixture before the titanium compound.

The reaction of the alcohol with the catalyst ingredients can be conducted at temperatures between 15° C. to about 100° C. but about room temperatures is completely satisfactory.

The amount of alcohol is chosen to give an alcohol to magnesium ratio between 0.1 to 5. Ratios higher than 2 give less reactive catalysts and are not normally desired. Ratios less than 0.5 normally do not result in a sufficient increase in hydrogen response. A ratio of about 1.0 is preferred.

The amount of titanium compound is normally less than the amount equivalent to the reactive surface groups. However, the amount of titanium compound can vary from 5% to 200% of that equivalent amount.

Trialkylaluminum compounds such as triethylaluminum and triisobutylaluminum are excellent cocatalysts. Alkyl aluminum hydrides like diisobutyl aluminum hydride can be used. Mixtures of organoaluminum compounds are suitable. An example is a combination of triisobutylaluminum and diethyl aluminum ethoxide.

The amount of cocatalyst is not critical. The molar ratio of organoaluminum cocatalyst to titanium compound in the solid, free-flowing catalyst can range from 0.1/1 to 100/1. Preferably, the ratio is from 1/1 to 10/1.

Activation of the catalyst with the cocatalyst can be accomplished within the polymerization reactor by the simultaneous feeding of both components. Alternatively, the cocatalyst can be added to the catalyst prior to entry into the polymerization zone.

DESCRIPTION OF THE PREFERRED EMBODIMENTS

The catalysts of this invention have higher melt index capability and reactivity than normal Ziegler catalysts. These catalysts are simple to prepare and in the preferred method, are highly economical because of the lack of necessity of calcination, solvent washing, high temperature reaction, grinding, etc.

In this invention, the silicon compound has one or more reactive groups for each silicon atom in the molecule. One of these reactive groups may be consumed by a surface reaction. Then the attached silicon atom may have no reactive group or it could have some reactive groups. The remaining reactive groups can interact with the magnesium component of the catalyst. By such interaction, the polymerization reactions can be influenced toward desirable properties in the polymer products.

The silicon compounds useful in this invention have the following structural formulae:

$(R_3Si)_2NH$ $R_nSiX_m$ where m is 1, 2 or 3, n is 3, 2 or 1, respectively, and the total of m+n=4, X is a group chemically reactive with the hydroxyl groups of the silica or alumina such as chloride, amide, alkoxide, phenoxide and the like. The invention requires at least one such reactive group. If more than one are used, they may be the same of different. Examples of reactive groups are —F, —Cl, —Br, —OCH$_3$, —OCH$_2$CH$_3$, —NH$_2$, —N(CH$_3$)$_2$, —N(H)Si(CH$_3$)$_3$, —CH$_2$CH$_2$CH$_2$Cl, —CH$_2$CH$_2$CH$_2$NH$_2$, —OCH$_2$CH$_2$OCH$_3$, —O$_2$CCH$_3$, and —CH$_2$CH$_2$CH$_2$SH. The R group is a hydrocarbon group containing only carbon and hydrogen. It may be, for example, alkyl, phenyl, or alkenyl such as vinyl.

The silicas or aluminas that are suitable for this invention may contain minor amounts of zirconia, magnesia, or titania. For catalyst manufacture, it is preferred to have relatively finely divided silica or alumina, which may be porous or nonporous.

Prior to reaction with the silane, the silica or alumina may be dried to completely remove surface water at a temperature less than 800° C. The drying may instead be only partial in some cases in order to leave a small amount of water, or the drying can be eliminated entirely depending on the structure of the organosilane compound. Usually, it is preferred to at least partially remove the surface water from the silica or alumina. For example, in the case of hexamethyl disilazane, a controlled amount of water on silica catalyzes the reaction of hexamethyl disilazane with silica.

The amount of silane compound may be in excess of the reactive groups of silica or alumina surface. When this is the case, the conversion of the surface groups can be made as complete as possible. The unreacted excess of silicon compound can be removed by distillation at less than 200° C. at decreased pressure if necessary, or by heat and inert gas purging. The reaction product of the silica or alumina with the silane should not be heated above 300° C., which might lead to thermal decomposition of the bonded silane groups.

The amount of silane compound may also be less than the stoichiometric equivalent of the reactive groups upon the silica or alumina. In this case, all of the silane compound may become attached to the surface so that no removal of excess is necessary.

The organomagnesium compounds useful in this invention are the alkyls or aryls of magnesium or its complexes such as complexes with alkyl aluminum compounds. The structural formulae of some preferred compounds are $R^2MgX_1$, $R'_2Mg$ and $(R_2{}^2Mg)_n \cdot AlR_3{}^2$ where $R^2$ is alkyl containing 1-10 carbon atoms or aryl such as phenyl, naphthyl and cyclopentadienyl and n is 0.5-10. X is a halide such as chloride or bromide. Complexes of organomagnesium compounds with organoaluminum halides can also be used. The complexes may contain small amounts of aluminum or magnesium alkoxides.

The amount of organomagnesium compound added to make the catalysts of this invention is determined by the amount of titanium compound. Normally, the Mg/Ti ratio is from 0.1 to 5, most preferably 1.0.

The addition of alcohol to the catalyst preparation is before the tetravalent titanium compound but can be before or after the addition of magnesium alkyl. The catalyst of this invention has an enhanced sensitivity to molecular weight control by hydrogen. This makes it possible to make high melt index particle form polyethylene with less hydrogen and at a lower polymerization temperature. The molar ratio of alcohol to magnesium alkyl is 0.1–5, most preferably 0.5–2.0.

The Group IVB and Group VB metals that are especially useful in this invention include titanium, zirconium and vanadium.

The preferred titanium compound may be selected from the following formulas:

$TiX_4$ $TiX_m(OR^2)_{(4-m)}$ in which m is 1, 2, 3 or 4, $R^2$ is selected from alkyl, aryl, cycloalkyl, alkaryl, cyclopentadienyl and alkenyl, for example, ethenyl, propenyl and isopropenyl, each of these groups having 1 to 12 carbon atoms, and X is halogen. When more than one $R^2$ group occurs in the titanium compound, the groups can be the same or different.

Titanium tetrachloride is a preferred compound. The amount of titanium compound is preferably less than the amount equivalent to the surface reactive groups. Nonetheless, this invention includes amounts of titanium compound, which are from 1 to 200 percent of that equivalent amount.

Following the reaction with the titanium compound, it is necessary to remove the excess solvent in order to have a free-flowing catalyst. In a preferred method, solvent is evaporated and collected. This results in essentially no reactor fouling and increases the bulk density of the product. Even through evaporation is the preferred method of solvent removal, filtration, centrifuging, or decantation can also be practiced.

The alkyl aluminum cocatalyst can be chosen from trialkyl aluminum compounds and alkyl aluminum hydride compounds and their mixtures. The alkyl groups of suitable cocatalysts have hydrocarbon chains containing one or about ten carbon atoms and may be straight chained or branched. Triaryl aluminum compounds may also be used but because they are not so readily obtained as the alkyl compounds, they are not preferred. Examples of suitable cocatalysts are triethylaluminum, trioctyl aluminum, tri(2-methyl pentyl)aluminum and diethyl aluminum hydride. Triisobutyl aluminum and diisobutylaluminum hydride are especially preferred. If needed, alkyl aluminum halides may be used along with the alkyl aluminum compounds described above.

The cocatalyst may be fed to the polymerization reactor along with the above-described solid component in the same or preferably separate lines. The molar ratio of the cocatalyst to the Group IVB and VB metal compounds in the solid component can be from 0.1:1 to 100:1 although the preferred range is 1:1 to 20:1.

When using the catalyst according to the invention, at least one 1-olefin of the formula $R^6$—CH=CH$_2$, where $R^6$ is hydrogen or a straight chain or branched alkyl radical having from 1 to 10, preferably from 1 to 8, carbon atoms is polymerized. Examples of such olefins are ethylene, propylene, butene-1, hexene-1, 4-methyl-pentene-1, octene-1.

The polymerization may be carried out in suspension, solution or in the gaseous phase, continuously or discontinuously, at a temperature of from 20°–300° C., preferably from 60°–110° C., under a pressure of from atmospheric to 10,000 psi gauge. It is carried out preferably under the technically interesting pressure in the range of from 300–800 psi.

The melt index of the polyethylene produced by the invention catalyst can be controlled by methods known to the art such as increasing the temperature of polymerization or by the addition of hydrogen. These catalysts show relatively high activity in ethylene polymerization and copolymerization. The polymers can be easily blended with antioxidants and pelletized for commercial use. High partial pressures of hydrogen can be used to yield very high melt index products.

The catalysts are useful for producing polymers of 1-olefins of 2 to 8 carbon atoms and copolymers of these with 1-olefins of 2 to 20 carbon atoms to form solid polymers or copolymers.

EXAMPLES

EXAMPLE 1

A catalyst was made with silica treated with hexamethyl disilazane and with the addition of n-butyl alcohol. A control catalyst was made without the addition of the alcohol for comparison.

Davison Chemical grade 952 silica was treated with hexamethyl disilazane. A 2.6 g quantity of the treated silica was transferred to a dry, nitrogen-filled flask. The silica was stirred with a magnet bar for one hour while a flow of $N_2$ was passed through the flask. The 7.7 ml of dibutyl magnesium-triethyl aluminum complex (Mg/Al=6.1) solution, 8.9 wt.% in heptane, 0.59 ml n-butyl alcohol, and 16.25 ml of heptane were added sequentially. The combination was kept at room temperature, under continuous $N_2$ flow, and stirring for 30 minutes. Then 0.36 ml titanium tetrachloride was added, and the combination stirred an additional 30 minutes at room temperature. The flask was immersed in a constant temperature bath at 90° C. until the heptane was evaporated and carried away by the $N_2$ stream. The catalyst remained in the flask as a free-flowing, light-yellow colored powder.

The catalysts were tested for ethylene polymerization at 215° F. with 500 ml isobutane in a 1400 ml vessel. Triisobutyl aluminum (TIBAL) solution in an amount of 9.2 mmoles per gram of catalyst was added for each test. The total pressure was 550 psig in each case. The following results were obtained:

| TiCl$_4$ mmol/g silica | n-BuOH/ Mg | H$_2$ (psi) | Reactivity | MI |
|---|---|---|---|---|
| 1.24 | 1.0 | 100 | 1668 | 8.0 |
| 1.24 | 1.0 | 100 | 1500 | 9.8 |
| 1.25 | 0 (control) | 100 | 1233 | 2.1 |

EXAMPLE 2

Another catalyst was made as described in Example 1 except that the proportions of magnesium compound, butyl alcohol, and titanium chloride were increased relative to the silane-treated silica. In this example, the amount of titanium tetrachloride was 1.75 mmol per gram of silane-treated silica instead of 1.25 mmol per gram. The Ti/Mg and alcohol to magnesium ratios were kept equal to 1.0.

For comparison, a catalyst was made in the same way but without the addition of the n-butyl alcohol.

The two catalysts were tested in a 2 l polymerization vessel. A 1000 ml volume of isobutane was pressured into the vessel as a slurry medium, and hydrogen was added to give a 100 psi pressure increase. During the polymerization tests, ethylene was fed as required to keep the total pressure constant at 550 psig. TIBAL at 9.2 mmoles per gram was the catalyst. The tests showed that the invention catalyst gave a much higher melt index:

|  | Reactivity g/g cat/hr | Melt Index |
|---|---|---|
| Invention Catalyst | 3310 | 39 |
| Comparison Catalyst | 3442 | 9.2 |

EXAMPLE 3

Another test of the catalyst of Example 2 was done in the 2 l pressure vessel but with only 50 psi hydrogen added instead of 100 psi.

This test gave an hourly catalyst reactivity of 5052 with the product having a melt index of 2.4 and an $R_D$ value of 3.6. Previously, a comparison catalyst had been made in a similar way but without silane-treated silica. In place of the silane-treated Davison 952 silica, thermally treated silica was used. The temperature of treatment was 600° C. This comparison catalyst gave an hourly reactivity of 2245, a melt index of 3.0, and an $R_D$ value of 4.5. The $R_D$ value is a measure of molecular weight distribution and was measured as described in the article in *Polymer Engineering and Science*, Vol. II, pages 124–128 (1971). The lower $R_D$ value of the polymer produced by the invention catalyst shows the product to be more suitable for injection molding applications.

EXAMPLE 4

The two catalysts of Example 2 were tested for ethylene-butene copolymerization in a 1400 ml pressure vessel. In each case a sample of the catalyst, a volume of 25 wt.% triisobutyl aluminum solution and 500 ml of isobutane were introduced into the polymerization vessel. The amount of triisobutyl aluminum solution was chosen to give 9.2 mmol/g of solid catalyst. The temperature of polymerization was 160° F. After the isobutane addition, hydrogen was added to give a 50 psi increase in pressure. Ethylene and 1-butene were then metered in over a period of five to seven minutes. Ethylene was added as required to give a total pressure of 350 psig while the amount of 1-butene added was approximately 22 wt.% of the reaction vessel contents. The reactions were continued for one hour after the 350 psig total pressure was attained. During this hour an additional 15 g quantity of butene was added to replace the portion polymerized.

The results of the tests showed that the invention catalyst gave a low density copolymer with superior melt elasticity. The invention catalyst also gave a higher melt index and reactivity:

|  | Reactivity g/g cat/hr | Melt Index |
|---|---|---|
| Invention Catalyst | 9090 | 4.6 |
| Comparison Catalyst | 4190 | 1.4 |

EXAMPLE 5

A catalyst was made in the same manner as described in Example 1 except that a different magnesium compound was used. A 1.8 g quantity of hexamethyldisilazane-treated silica was combined in a nitrogen atmosphere with 20 ml of heptane and 5.7 ml of a butyl octyl magnesium solution in heptane. The quantity of butyl octyl magnesium was 2.25 mmoles. The combination was stirred one half hour at room temperature, then 0.21 ml of n-butyl alcohol was added. This mixture was stirred for one half hour. A 0.25 ml volume of titanium tetrachloride was added as small drops from a syringe to form the catalyst slurry. The slurry was kept at room temperature for another thirty minutes, then the flask was immersed in an oil bath at 100° C. The flask was kept in the bath for 30 minutes at the end of which time the solvents had evaporated leaving a free-flowing solid.

Another catalyst was made with the butyl octyl magnesium solution in the same way except that the n-butyl alcohol was omitted.

The two catalysts were tested under identical conditions as described in Example 2, in a 2 l polymerization vessel with 100 psi hydrogen at 215° F. The results show that the alcohol catalyst gave polyethylene of higher melt index.

|  | Reactivity g/g cat/hr | Melt Index |
|---|---|---|
| Catalyst with n-butyl alcohol | 2227 | 55 |
| Catalyst without alcohol | 2190 | 12.4 |

EXAMPLE 6

This example shows the use of another magnesium compound. A catalyst was prepared with the addition of n-butyl alcohol in the same way as the catalyst of Example 5 except that a dibutyl magnesium solution was added instead of the butyl octyl magnesium solution. The dibutyl magnesium solution was obtained from the Lithium Corporation of America. In this product, a portion of butyl groups are secondary butyl groups and the remainder are normal butyl groups. A polymerization test was conducted as in Example 5 giving polyethylene with a melt index of 49 and a reactivity of 1463 g/g cat. hr.

EXAMPLE 7

In this example, the molar ratio of the alcohol to the magnesium compound was varied. Three catalysts were made with the addition of n-butyl alcohol as described in Example 5 but with different amounts of alcohol. Also, in this case, butyl ethyl magnesium was used as the magnesium compound. The amount of butyl ethyl magnesium solution for each of the three catalysts was 1.25 mmoles per gram of the hexamethyldisilazane-treated silica. The amount of titanium tetrachloride was also 1.25 mmoles per gram in each case. However, the volume of n-butyl alcohol added was varied as shown below with the results of polymerization tests. Polymerization conditions were the same as those of Example 2.

| Catalyst | Butyl Alcohol/ $R_2Mg$ Molar Ratio | Reactivity g/g cat. hr. | Melt Index |
|---|---|---|---|
| A | 0.83 | 2309 | 50 |
| B | 1.0 | 3495 | 45 |
| C | 1.25 | 1761 | 39 |

EXAMPLE 8

This example shows the preparation of a catalyst with a Mg/Ti atomic ratio of 0.5 instead of the Mg/Ti atomic ratio of 1.0 in previous examples. The procedure for preparation was the same as in Example 5, and butyl ethyl magnesium was the magnesium compound. A 2.1 g quantity of the silane-treated silica was transferred to the dry, $N_2$-purged flask. A 20 ml volume of heptane and 1.91 ml of the butyl ethyl magnesium solution were combined with the silica. With reaction periods as in Example 5, 0.11 ml n-butyl alcohol and 0.29 ml of titanium tetrachloride were added. The solvent was evaporated by heating at 100° C. for 50 minutes. In the polymerization test at 215° F. with 100 psi $H_2$, polyethylene with a melt index of 36 was produced. The reactivity of the catalyst was 2471 g/g cat.hr. TIBAL solution at 9.2 mmoles per gram of catalyst was again employed as the cocatalyst.

EXAMPLE 9

This example shows that the magnesium to titanium atomic ratio can be greater than 1.0 in the invention catalyst. The procedure and ingredients were the same as in Example 8 but the Mg/Ti atomic ratio was 1.5, the butyl ethyl magnesium to n-butyl alcohol molar ratio was 1.0, and the titanium tetrachloride was 1.25 mmoles per gram of silane-treated silica.

The catalyst was tested for the synthesis of a 1-butene-ethylene copolymer as described in Example 4. The reactivity was found to be 4364 g/g cat.hr. The melt index of the product was 2.9 and its density was 0.927.

The catalyst was also tested in the particle form synthesis of polyethylene as described in Example 2. The melt index of the homopolymer was 57, and the reactivity of the catalyst under the given conditions was 1917 g/g cat.hr.

EXAMPLE 10

A catalyst was prepared as in Example 1 except that benzyl alcohol was added to the preparation instead of butyl alcohol. The catalyst was tested in ethylene-butene copolymerization as described in Example 2. The catalyst reactivity was 1321 g/g cat. per hour, and the melt index was 2.6.

EXAMPLE 11

A quantity of Davison Chemical Company grade 952 silica was first dried at 300° C. in a bed fluidized by nitrogen. A 1.3 g quantity of the dried silica was transferred to a flask, and combined with 15 ml hexane and 0.24 ml of allydimethylchlorosilane. The amount of allyldimethylchlorosilane was 1.25 mmoles per gram of silica. The combination was stirred in an inert atmosphere at room temperature for 30 minutes. At this stage, volatile materials were evaporated in a nitrogen stream by immersing the flask in a bath at 100° C. Upon cooling, 15 ml hexane and 3.9 ml of dibutyl magnesium triethylaluminum complex solution (Mg/Al=6.1) were added. After 30 minutes, 0.15 ml of n-butyl alcohol was added. The molar ratio of alcohol to dibutyl magnesium was calculated to be 1.0. After an additional 30 minutes, 0.13 ml of titanium tetrachloride was added. The solvents were evaporated in a nitrogen stream at 100° C. The dry catalyst was white.

The catalyst was tested with triisobutyl aluminum cocatalyst in ethylene-butene copolymerization as described in Example 2. The reactivity was 2735 g/g cat. per hour, the melt index was 4.8, and the density was 0.919.

This example shows that allyldimethyl chlorosilane can be the silane compound.

EXAMPLE 12

The catalyst of Example 11 was tested in ethylene-hexene copolymerization. The procedure was similar to that described in Example 2. Instead of about 22 wt.% butene, about 26 wt.% 1-hexene was added. Also, instead of a total pressure of 350 psig, the pressure in this test was 300 psig.

The product was recovered as particles. Its melt index was 6.5, and its density was 0.924. The catalyst reactivity was 2095 g/g cat. per hour.

This example shows that low density ethylene-hexene copolymers can be made with the catalyst of this invention.

EXAMPLE 13

A catalyst was prepared as in Example 11 except that an equimolar amount of n-dodecyl trichlorosilane was substituted for the allyldimethylchlorosilane.

This catalyst was tested in ethylene-butene copolymerization as described in Example 2. The product copolymer had a density of 0.919 and a melt index of 3.1. The reactivity was 2832 g/g cat. per hour.

EXAMPLE 14

Again, a catalyst was made as in Example 11, but with a different silane compound. The silane compound was N,O-bis-(trimethylsilyl)acetamide. In an ethylene-butene copolymerization test like Example 2, the reactivity was found to be 2010 g/g cat. per hour.

EXAMPLE 15

A catalyst was made as in Example 11, but with N-trimethylsilyl diethylamine. In ethylene-butene copolymerization, the reactivity was found to be 3351 g/g cat. per hour.

EXAMPLE 16

In this example the order of addition of the catalyst components is different. Davison Chemical grade 952 silica was treated with hexamethyldisilazane. Prior to catalyst preparation, this treated silica was heated at 100° C. for one hour in flowing nitrogen. To 2.0 g of the treated silica, 20 ml of hexane and 0.23 ml of n-butyl alcohol were added. The combination was stirred for 30 minutes, then 5.94 ml of a dibutyl magnesium triethylaluminum complex solution was added (Mg/Al=6.1). The concentration was 8.9 wt.%, and the solvent was heptane. After another 30 minutes, 0.28 ml of titanium tetrachloride was added. The liquids were evaporated at 100° C. under nitrogen starting 30 minutes after the addition of the titanium tetrachloride.

The catalyst was tested three times in copolymerizations with the following results:

| | Comonomer | Approximate Amount of Comonomer | Reactivity | MI | Density |
|---|---|---|---|---|---|
| A | Butene | 22 wt. % | 4930 | — | — |
| B | Butene | 22 wt. % | 4502 | 4.5 | .925 |
| C | Hexene | 26 wt. % | 4611 | 6.1 | .932 |

The temperature of the experiments was 160° F. for butene copolymerization and 155° F. for hexene copolymerization. For butene copolymerizations, the total pressure was 350 psig, and for hexene copolymerization, it was 300 psig. Hydrogen to give a 50 psi increase in pressure was added to the isobutane, which was the solvent in each test.

EXAMPLE 17

An invention catalyst was made again like Example 16 except that the butyl alcohol was added after the magnesium compound instead of before it. This catalyst was tested as described in Example 16.

| | Comonomer | Approximate Amount of Comonomer | Reactivity | MI | Density |
|---|---|---|---|---|---|
| A | Butene | 22 wt. % | 4578 | 5.0 | .925 |
| B | Butene | 22 wt. % | 3150 | 3.4 | .925 |
| C | Hexene | 26 wt. % | 2185 | 9.0 | .932 |

This example and Example 16 show that increased melt index values can be obtained with the catalyst of this invention when the alcohol is added before the magnesium compound and after the magnesium compound.

GLOSSARY OF TERMS

LLDPE—The common designation: Linear low density polyethylene; more accurately, ethylene-1-alkene copolymers with the copolymers containing up to 20% by weight of alkene groups and each alkene having from 3 to 8 carbon atoms, inclusive TIBAL—Triisobutyl aluminum $R_D$—A measure of molecular weight distribution, as described in *Polymer Engineering and Science*, Vol. II, pages 124–128 (1971).

We claim:

1. The method of making polymers and copolymers of ethylene which comprises polymerizing ethylene, or ethylene and at least one 1-olefin under polymerizing conditions with a catalyst system comprising an alkyl or aryl aluminum compound cocatalyst and a catalyst prepared by:
   (1) reacting an organic silicon compound with silica or alumina having surface hydroxyl groups or a mixture thereof, said organic silicon compound being reactive with said surface hydroxyl groups and selected from the group consisting of N, O-bis-(trimethylsilyl) acetamide and compounds of the formulae $(R_3Si)_2NH$ and $R_nSiX_m$ wherein m and n are 1, 2 or 3, $m+n=4$, X is a group which is chemically reactive with said surface hydroxyl groups selected from the group consisting of —OCH$_3$, —OCH$_2$CH$_3$, —NH$_2$, —N(CH$_3$)$_2$, —OCH$_2$CH$_2$OCH$_3$ and —O$_2$CCH$_3$, and R is a hydrocarbon group consisting solely of carbon and hydrogen;

(2) reacting in the presence of a solvent the product of (1) with an organomagnesium compound or complex;

(3) reacting the product of (2) with an alcohol of the formula R'OH wherein R' is an alkyl or benzyl group consisting solely of carbon and hydrogen, the amount of said alcohol being selected to result in an alcohol/magnesium molar ratio of about 0.1 to about 5; or, alternatively, (2') reacting in the presence of a solvent the product of (1) with the alcohol of (3); and, (3') reacting the product of (2') with an organomagnesium compound or complex; and (4) reacting the product of (3) or (3') with a halide or alkoxide of titanium, vanadium, zirconium or mixtures thereof.

2. The method of claim 1 wherein said alcohol comprises ROH in which R is an alkyl of 1–10 carbon atoms.

3. The method of claim 1 wherein the metal of (4) is in a concentration of about 0.1–20 wt.% of said catalyst.

4. The method of claim 1 wherein said reaction of (1) is with silica which has been predried at about 100°–200° C. for a time sufficient to remove surface water prior to said reaction.

5. The method of claim 1 wherein said organic silicon compound in (1) is in stoichiometric excess thereby facilitating a complete reaction, and said excess is later removed.

6. The method of claim 1 wherein the product of (1) is separated from any unreacted organic silicon compound and reaction by-products.

7. The method of claim 6 wherein said separation is by vacuum suction.

8. The method of claim 6 wherein said separation is by purging with a gas inert to the product of (1).

9. The method of claim 1 wherein said separation is at a temperature between ambient and 200° C.

10. The method of claim 1 wherein said aluminum cocatalyst is a trialkyl aluminum, an alkyl aluminum hydride or a mixture thereof.

11. The method of claim 1 wherein said aluminum cocatalyst comprises an aryl aluminum compound.

12. The method of claim 1 wherein said aluminum cocatalyst comprises an alkyl aluminum, an alkyl aluminum halide or a mixture thereof.

13. The method of claim 1 wherein said aluminum cocatalyst comprises a trialkyl aluminum or an alkyl aluminum hydride.

14. The method of claim 1 wherein said aluminum cocatalyst is in a molar ratio with the product of (2) of from 0.1–100 to 1.

15. The method of claim 14 wherein said ratio is from about 1–20 to 1.

16. The method of claim 1 wherein said 1-olefin consists essentially of ethylene and another olefin to produce medium and low density copolymers.

17. The method of claim 1 wherein said 1-olefin is of the formula R—CH=CH$_2$ wherein R is an alkyl having 1–10 carbon atoms.

18. The method of claim 17 wherein said 1-olefin is a mixture containing about 70 wt.% of ethylene.

19. The method of claim 1 wherein said polymerization is at a temperature of from about 20°–150° C. at a pressure of between about 100 and 1000 psi.

20. The method of claim 1 wherein said polymerization is at a temperature of from about 60°–110° C. at a pressure of between about 100 and 1000 psi.

21. The method of claim 20 wherein said polymerization is at a pressure of between about 300 and 800 psi.

* * * * *